United States Patent [19]

Peterson et al.

[11] Patent Number: 5,217,819
[45] Date of Patent: Jun. 8, 1993

[54] METHOD OF MANUFACTURING A THIN-FILM MAGNETIC HEAD AND MAGNETIC HEAD

[75] Inventors: James R. Peterson, Eden Prairie, Minn.; Johannes F. De Proost, Einhoven, Netherlands; Gerardus H. J. Somers, Eindhoven, Netherlands; Franciscus A. Pronk, Eindhoven, Netherlands; Victor Zieren, Eindhoven, Netherlands; Helmut J. Gassen, Eindhoven, Netherlands; Johannes H. C. Franssen, Eindhoven, Netherlands; Rudolf A. Van Doorn, Eindhoven, Netherlands

[73] Assignee: U.S. Philips Corporation, New York, N.Y.

[21] Appl. No.: 697,140

[22] Filed: May 8, 1991

[51] Int. Cl.⁵ ............................................. B32B 9/00
[52] U.S. Cl. ............................ 428/693; 427/130; 427/131; 427/162; 427/258; 427/265; 427/271; 427/282; 427/331; 428/900; 428/928
[58] Field of Search .............. 427/131, 130, 162, 258, 427/265, 271, 282, 331; 428/900, 694, 693, 928

Primary Examiner—Bernard Pianalto
Attorney, Agent, or Firm—John C. Fox

[57] ABSTRACT

For a tape contact face to be formed in a thin-film magnetic head having at least one transducing element, by removing material, a reference plane (29) corresponding to the tape contact face is detected by means of a plurality of markers (27A-27J) juxtaposed in a layer and extending transversely to the tape contact face, which markers have first end portions (27A1-27J1) pointing in one direction and second, spatially separated end portions (27A2-27J2) pointing in an opposite direction, with the second end portions located at different distances from the reference plane, inclined with respect to the reference plane, and adjoining each other steplessly.

17 Claims, 3 Drawing Sheets

METHOD OF MANUFACTURING A THIN-FILM MAGNETIC HEAD AND MAGNETIC HEAD

BACKGROUND OF THE INVENTION

The invention relates to a method of manufacturing a thin-film magnetic head having at least one transducing element, in which the magnetic head is built up layer by layer, and a tape contact face is formed by removing material said tape contact face is detected by means of a plurality of markers juxtaposed in a layer and extending transversely to said tape contact face, said markers having first end portions pointing in one direction and second, spatially separated end portions pointing in an opposite direction, adjacent second end portions being located at different distances from a reference corresponding to a tape contact face portion is being formed by removing material.

Such a method is known from JP-A 56-29832, JP-A 57-162115 and JP-A 59-223919 (all herein incorporated by reference). In the known method a comb-shaped pattern intersecting a defined reference plane is provided at both sides of a magnetic yoke by means of a thin-film technique. Each comb-shaped pattern has a plurality of outwardly projecting teeth of mutually different lengths. The teeth terminate in outwardly projecting, staggered end portions. A contact face for cooperation with a magnetic tape is formed by means of a polishing process, with an increasing number of teeth becoming visible during polishing. The reference plane is determined from a count of the number of visible teeth, whereafter the polishing process is ended. A drawback of the known method is that the accuracy with which the reference plane can be detected is dependent on the step size between said end portions so that the detection of the reference plane is generally comparatively coarse and no accurately reproducible gap height or pole height can be achieved.

OBJECTS AND SUMMARY OF THE INVENTION

It is one of the objects of the invention to provide a method with which a desired gap height in a thin film magnetic head or pole height can be formed in an accurate manner.

To this end the method according to the invention is characterized in that the markers are formed in such a way that the second end portions are arranged obliquely (inclined) with respect to the reference plane, while juxtaposed second end portions adjoin each other steplessly. It is thus possible to accurately follow the approach to the reference plane and to detect the reference plane accurately when removing material to form the tape contact face, so that the tape contact face portion related to the reference plane can be provided with great precision.

An embodiment of the method according to the invention is characterized in that the markers are formed in such a way that the first end portions are arranged mutually stepwise and are reached first during the removal of material.

This has the advantage that material can be removed parallel to the reference plane with sufficient accuracy and already at a relatively large distance from the reference plane and that any angular error can be corrected after an optical check.

Another embodiment of the method according to the invention is characterized in that the markers are formed in such a way that at least one of the first end portions and at least one of the second end portions are equidistant from the reference plane.

In this embodiment all markers are visible for only a short period in the area to approach of the reference plane when the method is being carried out. Subsequently the number of markers will decrease gradually. This has the advantage that the method can be performed both accurately and rapidly.

Another embodiment of the method according to the invention is characterized in that two outer markers are formed in such a way that their first end portions are located at the largest distance from the reference plane.

This has the advantage that orientation with respect to the reference plane can be realised at an early stage, when forming the tape contact face. Moreover, extra information about the face achieved with respect to the reference plane is obtained during removal of the material, for example, by means of grinding, polishing and/or lapping.

Another embodiment of the method according to the invention is characterized in that the markers and an insulation layer adjoining the transducing element are formed simultaneously while using one mask.

This has the advantage that the gap height or pole height of the magnetic head to be formed is defined completely. Consequently, possible position errors of the transducing element and/or flux guides do not have any influence on the accuracy with which the gap height or pole height can be formed.

If the markers are formed simultaneously with the insulation layer, a polymer, for example a photoresist is preferably used as a material. To improve the optical contrast it is favourable in this case to provide the markers on a first optically contrasting layer and subsequently coat them with a second contrasting layer. These contrasting layers may be, for example, metal layers and may be provided simultaneously with flux guides. The metal layers may be formed, for example, from NiFe alloys or FeSiAl alloys.

The markers which are provided by the method according to the invention may be obtained by means of known thin-film techniques such as electrodeposition, vacuum deposition, sputtering or vapour deposition.

The invention also relates to a magnetic head manufactured by the method according to the invention. The transducing element of the magnetic head may be of an inductive type or of a magnetoresistive type.

BRIEF DESCRIPTION OF THE DRAWING

The invention will be described in greater detail by way of example with reference to the accompanying drawings in which.

DESCRIPTION OF THE PREFERRED EMBODIMENTS

Figure 1:
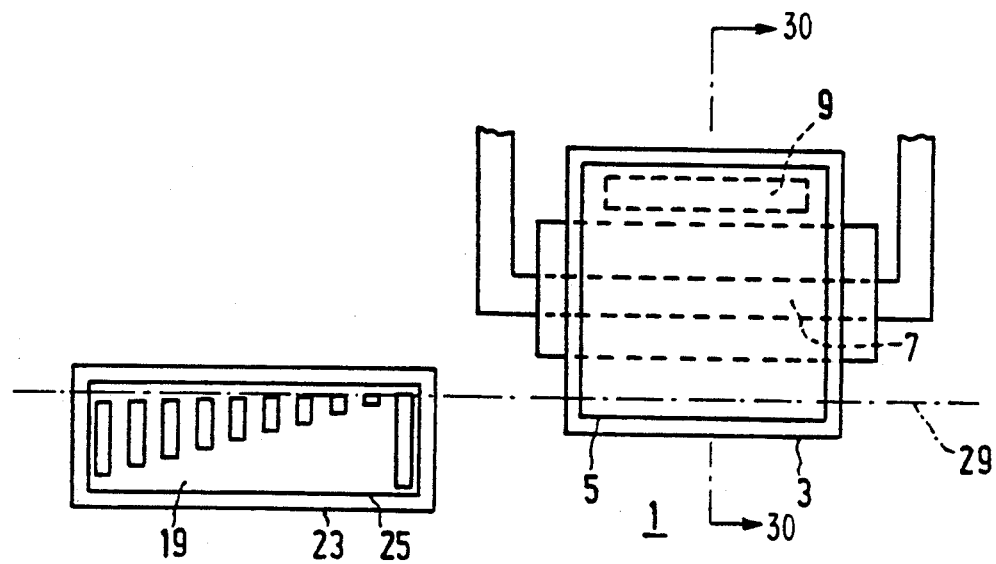
FIG. 1 shows diagrammatically a stage of the method according to the invention.
Figure 2:
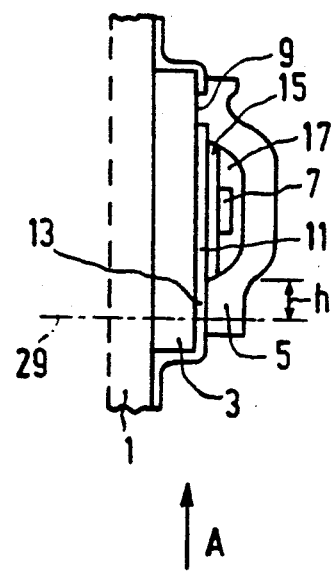
FIG. 2 is a cross-section taken on the line 30—30 in FIG. 1.

The structure shown in FIGS. 1 and 2 comprises a non-magnetic substrate 1, a first flux guide 3, a second flux guide 5 and a transducing element 7. The first flux guide 3 and the second flux guide 5, which are interconnected in an area 9, constitute a magnetic circuit within which the transducing element 7 is present. The transducing element 7 is an inductive element, notably a coil in this embodiment. The transducing element may alternatively be a magnetoresistive element. Outside the area 9 a non-magnetic layer 11, which forms a gap 13 between the two free ends of the flux guides 3 and 5 and which is made of, for example an oxide, is present between the first flux guide 3 and the second flux guide 5. The layer 11 is provided with a first insulation layer 15 on which the transducing element 7 and subsequently a second insulation layer 17 are provided. The insulation layers 15 and 17 form, as it were, a chamber for the transducing element 7. The structure shown also has a pattern 19 with markers. The pattern 19 is formed simultaneously with the first insulation layer 15 and is present between a first metal layer 23 and a second metal layer 25 which have been provided simultaneously with the first flux guide 3 and the second flux guide 5, respectively. In the structure shown further insulation layers, which are not shown, have been or may be provided. The structure may be built up by means of known thin-film techniques. Suitable materials for the layers 23 and 25 as well as for the flux guides 3 and 5 are, for example NiFe alloys and FeSiAl alloys. Suitable insulation materials are, for example $Al_2O_3$ and $SiO_2$. A suitable substrate material is, for example the ceramic material $Al_2O_3/TiC$.

Figure 3:
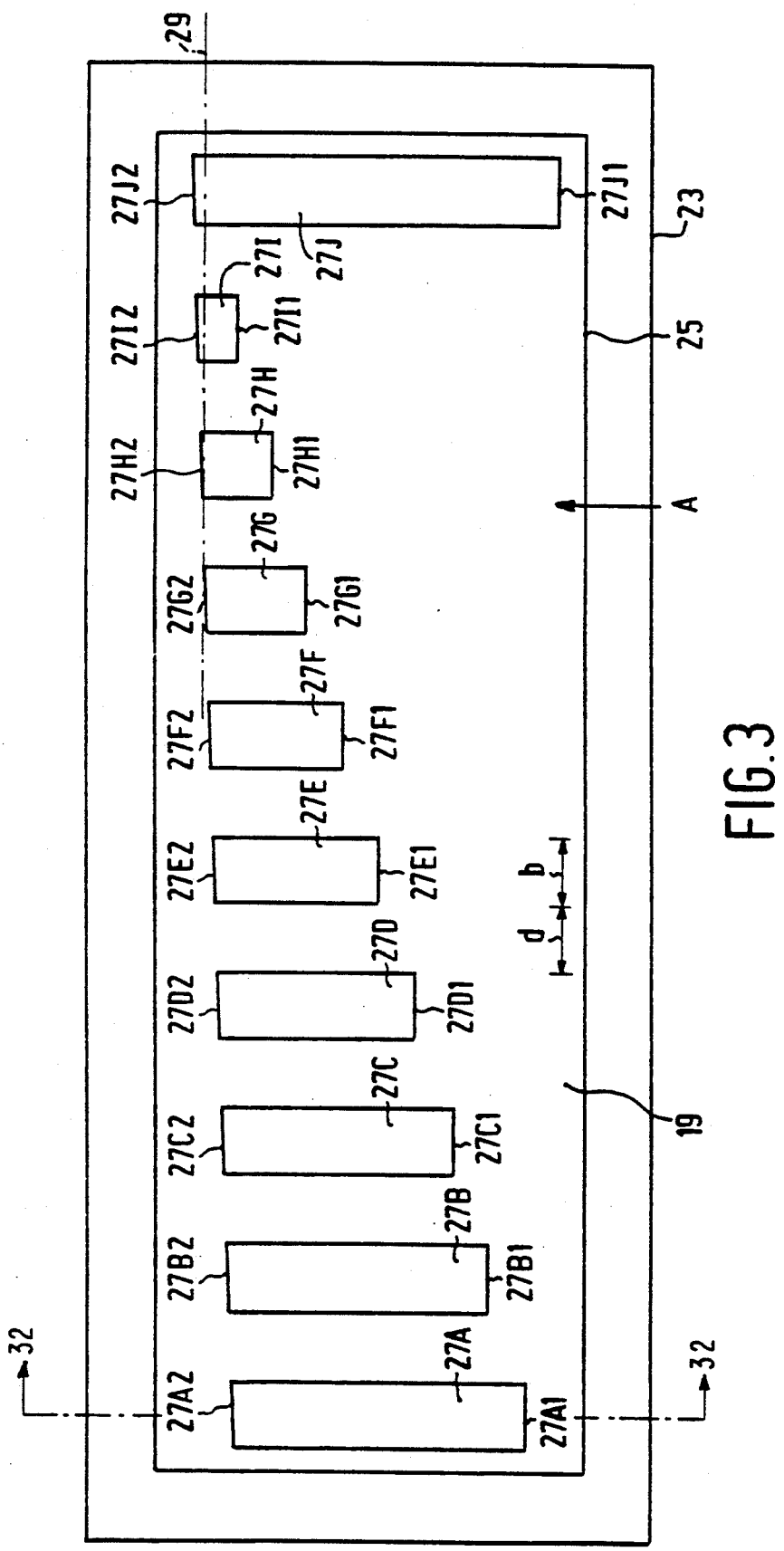
FIG. 3 is an enlarged detail of FIG. 1.

The pattern 19, which is shown in greater detail in FIG. 3, comprises a row of markers 27A to 27J having a width which is indicated by means of the letter b. The mutual distance is indicated by means of the letter d and in this embodiment it is equal to the width b. The markers, which are generally elongate, have first end portions 27A1 to 27J1 and second end portions 27A2 to 27J2. The markers are used for detecting a reference plane 29. The reference plane 29 defines a tape contact face portion 31 to be formed (see FIGS. 5 and 6) and thus a gap height or pole height h. The tape contact face portion 31, which forms part of a tape contact face of the magnetic head according to the invention, is formed by removing material, for example by means of grinding, polishing and/or lapping. The polishing or lapping direction is denoted by means of the arrow A in FIGS. 2 and 3. The markers 27A to 27J of different lengths are formed in such a way that the second end portions 27A2 to 27J2 are inclined with respect to the reference plane 29. The second end portions are also formed in such a way that two juxtaposed second end portions, for example end portion 27A2 and end portion 27B2 adjoin each other steplessly. As a result, the position where material is removed can be accurately fixed by regularly checking the pattern of markers, for example by means of a microscope. The first end portions 27A1 to 27J1 of the markers pointing into a direction opposite to the polishing direction A are arranged mutually stepwise. In this embodiment the position of the first end portion 27I1 is such that its distance from the reference plane 29 is equal to the largest distance between the second end portion 27A2 and the reference plane 29.

Figure 4:
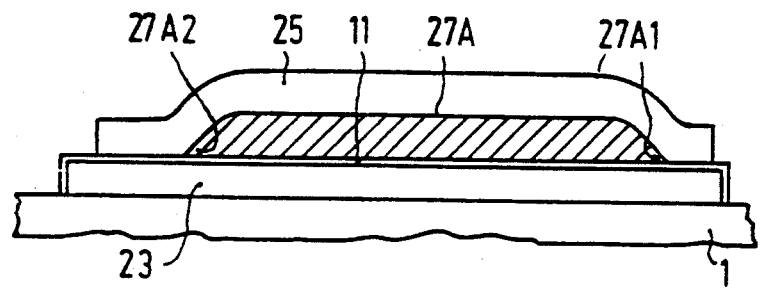
FIG. 4 is a cross-section taken on the line 32—32 in FIG. 3.

The marker 27A enclosed between the layers 23 and 25 is shown in a longitudinal section in FIG. 4.

Figure 5:
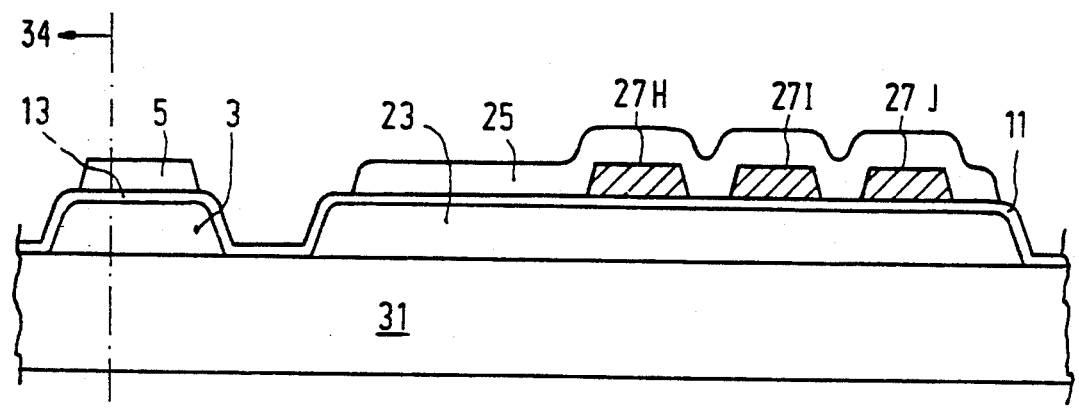
FIG. 5 is a partial front elevation of a magnetic head according to the invention.

FIG. 5 is an elevational view of the tape contact face portion 31 of the magnetic head manufactured by the method according to the invention as described hereinbefore. The tape contact face portion 31 and generally the tape contact face is obtained by removing material in a direction indicated by arrow A in FIGS. 2 and 3 until the reference plane 29 is reached. The parts of the markers 27H, 27I and 27J which still remain are visible in the tape contact face.

Figure 6:
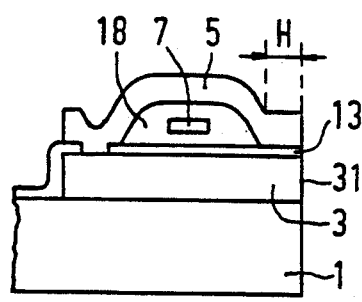
FIG. 6 is a cross-section taken on the line 34—34 in FIG. 5.

FIG. 6 is a cross-sectional view of the magnetic head according to the invention. The magnetic head has a gap 13 between two flux guides 3 and 5, which gap extends from a winding aperture 18 to a tape contact face 31. The winding aperture accommodates a transducing element 7. The gap height is denoted by the height H which accurately corresponds to the desired height h indicated in FIG. 2.

It is to be noted that the invention is not limited to the embodiment shown. For example, it is possible within the scope of the invention to provide a pattern of markers at both sides of the magnetic circuit. The method according to the invention may also be used successfully for manufacturing a magnetic head having several transducing elements.

We claim:

1. A method of manufacturing a thin-film magnetic head having at least one transducing element and a tape contact face, the method comprising:
   (a) building up the magnetic head layer by layer on a substrate,
   (b) forming a plurality of juxtaposed markers in a layer, the markers extending transversely to a reference plane corresponding to a tape contact face portion of said tape contact face, said markers having first end portions pointing in one and the same direction and second, spatially separated end portions pointing in an opposite direction, adjacent second end portions being located at different distances from the reference plane,
   (c) forming the tape contact face by removing material, and
   (d) detecting the tape contact face by means of the markers, characterized in that the markers are formed in such a way that the second end portions are inclined with respect to the reference plane, and juxtaposed second end portions adjoin each other steplessly.

2. A method as claimed in claim 1, characterized in that the first end portions are arranged mutually stepwise and are reached first during the removal of material.

3. A method as claimed in claim 2, characterized in that at least one of the first end portions and at least one of the second end portions are equidistant from the reference plane.

4. A method as claimed in claim 2, characterized in that the first end portions of the two outer markers are located at the largest distance from the reference plane.

5. A method as claimed in claim 2, characterized in that the markers and an insulation layer adjoining the transducing element are formed simultaneously using one and the same mask.

6. A method as claimed in claim 2, characterized in that the markers are provided on a first optically contrasting layer and are covered with a second contrasting layer.

7. A method as claimed in claim 1, characterized in that at least one of the first end portions and at least one of the second end portions are equidistant from the reference plane.

8. A method as claimed in claim 7, characterized in that the first end portions of the two outer markers are located at the largest distance from the reference plane.

9. A method as claimed in claim 7, characterized in that the markers and an insulation layer adjoining the transducing element are formed simultaneously using one and the same mask.

10. A method as claimed in claim 7, characterized in that the markers are provided on a first optically contrasting layer and are covered with a second contrasting layer.

11. A method as claimed in claim 1, characterized in that the first end portions of the two outer markers are located at the largest distance from the reference plane.

12. A method as claimed in claim 11, characterized in that the markers and an insulation layer adjoining the transducing element are formed simultaneously using one and the same mask.

13. A method as claimed in claim 11, characterized in that the markers are provided on a first optically contrasting layer and are covered with a second contrasting layer.

14. A method as claimed in claim 1, characterized in that the markers and an insulation layer adjoining the transducing element are formed simultaneously using one and the same mask.

15. A method as claimed in claim 14, characterized in that the markers are provided on a first optically contrasting layer and are covered with a second contrasting layer.

16. A method as claimed in claim 1, characterized in that the markers are provided on a first optically contrasting layer and are covered with a second contrasting layer.

17. A magnetic head manufactured by a method as claimed in any one of the preceding claims.

* * * * *